(12) United States Patent
Iida et al.

(10) Patent No.: US 7,057,643 B2
(45) Date of Patent: Jun. 6, 2006

(54) IMAGE CAPTURING SYSTEM, IMAGE CAPTURING APPARATUS, AND MANUAL OPERATING APPARATUS

(75) Inventors: Kentaro Iida, Ikoma (JP); Satoshi Himeda, Amagasaki (JP)

(73) Assignee: Minolta Co., Ltd., Osaka (JP)

( * ) Notice: Subject to any disclaimer, the term of this patent is extended or adjusted under 35 U.S.C. 154(b) by 712 days.

(21) Appl. No.: 10/157,310

(22) Filed: May 29, 2002

(65) Prior Publication Data

US 2002/0180878 A1 Dec. 5, 2002

(30) Foreign Application Priority Data

May 30, 2001 (JP) .............................. 2001-162521

(51) Int. Cl.
*H04N 5/228* (2006.01)
(52) U.S. Cl. ............ 348/208.14; 348/169; 348/333.02; 348/211.8
(58) Field of Classification Search ............ 348/207.1, 348/207.11, 211.99, 211.1, 211.2, 211.4, 348/211.8, 211.12, 211.13, 211.14, 169, 170, 348/208.14
See application file for complete search history.

(56) References Cited

U.S. PATENT DOCUMENTS

| | | | | |
|---|---|---|---|---|
| 5,355,163 A | * | 10/1994 | Tomitaka | 348/234 |
| 5,530,420 A | * | 6/1996 | Tsuchiya et al. | 340/435 |
| 5,589,878 A | | 12/1996 | Cortjens et al. | 348/211 |
| 5,627,586 A | * | 5/1997 | Yamasaki | 348/169 |
| 6,323,898 B1 | * | 11/2001 | Koyanagi et al. | 348/169 |
| 6,535,793 B1 | * | 3/2003 | Allard | 700/259 |
| 6,538,663 B1 | * | 3/2003 | Kamei | 345/635 |
| 6,611,285 B1 | * | 8/2003 | Morita | 348/211.3 |
| 6,727,954 B1 | * | 4/2004 | Okada et al. | 348/374 |
| 6,750,913 B1 | * | 6/2004 | Noro et al. | 348/333.02 |
| 2001/0022624 A1 | * | 9/2001 | Tanaka et al. | 348/333.02 |
| 2002/0154007 A1 | * | 10/2002 | Yang | 340/456 |
| 2003/0011704 A1 | * | 1/2003 | Sawachi | 348/372 |
| 2004/0027460 A1 | * | 2/2004 | Morita | 348/211.99 |
| 2004/0080625 A1 | * | 4/2004 | Kurosawa et al. | 348/211.99 |
| 2005/0018053 A1 | * | 1/2005 | Suga et al. | 348/211.13 |

FOREIGN PATENT DOCUMENTS

| | | | |
|---|---|---|---|
| JP | 10-093855 A | | 4/1998 |
| JP | 2000059674 A | * | 2/2000 |

* cited by examiner

*Primary Examiner*—Ngoc-Yen Vu
*Assistant Examiner*—Nelson D Hernandez
(74) *Attorney, Agent, or Firm*—Sidley Austin LLP

(57) ABSTRACT

A portable phone which is a manual operating apparatus of an image capturing system has an image processing section 340, an operation control section 341 and a communication section 342. The image processing section 340 acquires information regarding view position of a camera from image data 110 received by the communication section 342 and generates view position data 102. Also, it receives from the operation control section 341 information regarding an inputted optical operation command and generates garget position data 111. Furthermore, it performs a necessary process on the image data 110 to display the same on an image display section 32, as well as displays a view position of the camera and a target position of visual field after driving of the camera based on the view position data 102 and the target position data 111.

5 Claims, 13 Drawing Sheets

F I G . 4
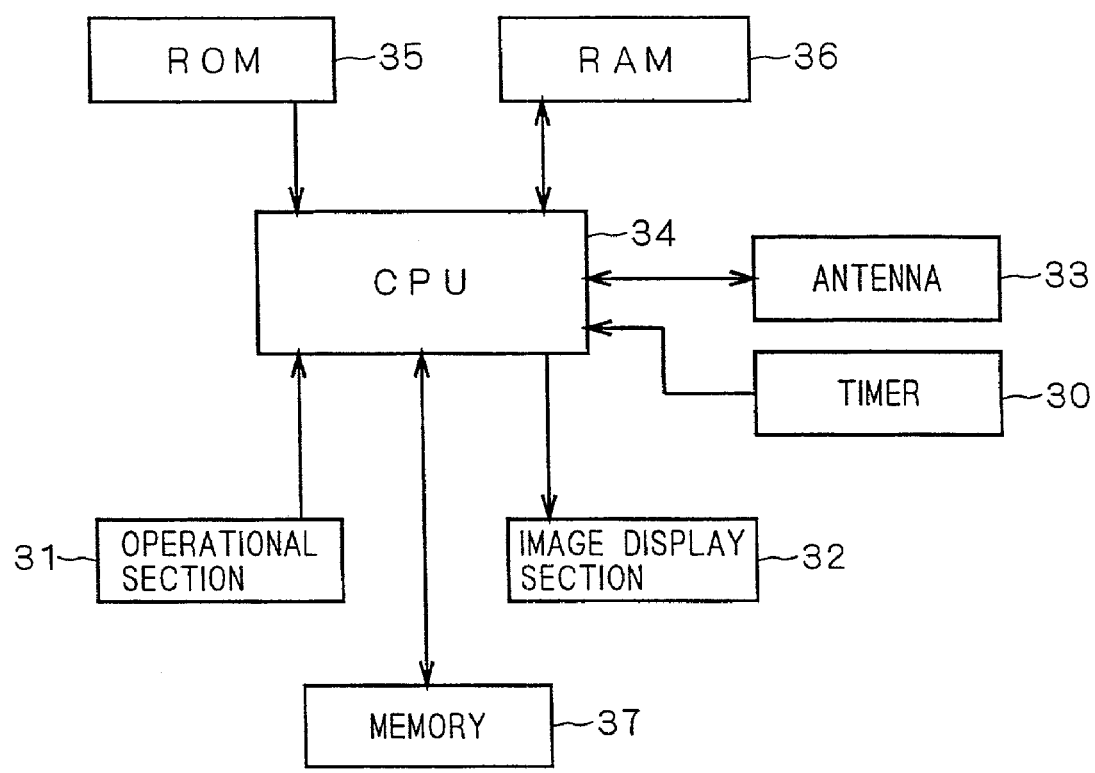

F I G . 1 6
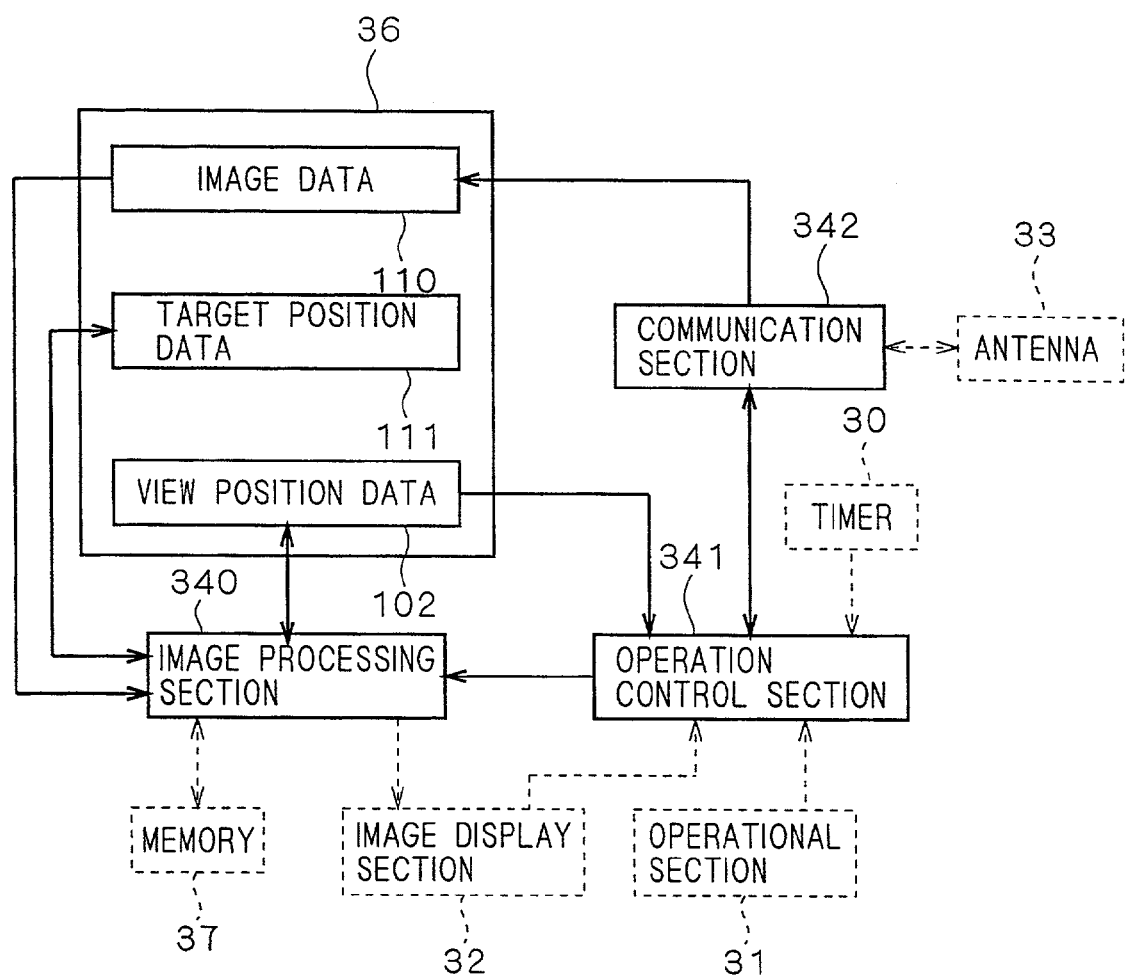

IMAGE CAPTURING SYSTEM, IMAGE CAPTURING APPARATUS, AND MANUAL OPERATING APPARATUS

This application is based on application No. 2001-162521 filed in Japan, the contents of which are hereby incorporated by reference.

BACKGROUND OF THE INVENTION

1. Field of the Invention

The present invention relates to a technique for capturing an image by remotely operating an image capturing apparatus, and more specifically to improvement of operational environment of users in such an image capturing system.

2. Description of the Background Art

In a system which acquires an image by operating a camera, when a user (an operator) drives a camera to a desired position, there arises a problem that a capture range of the camera is overdriven to excess of the position desired by the user because the user has entered operation commands more than necessary.

SUMMARY OF THE INVENTION

It is an object of the present invention to reduce erroneous operations by users and provide a comfortable operational environment system wherein an image is captured by operating a camera.

The present invention is directed to an image capturing system.

In a first aspect, an image capturing system includes a manual operating apparatus inputting at least one command, an image capturing apparatus acquiring image data of an object, receiving the command inputted by the manual operating apparatus via communication with the manual operating apparatus and changing a view position of the image capturing apparatus based on an optical operation command which is included in the command, a display receiving the image data acquired by the image capturing apparatus and displaying the image data, and a controller controlling the display to show a relative positional relationship between the view position of the image capturing apparatus and a target position after changing of the view position based on the optical operation command.

In accordance with this, since the captured image after driving can easily be predicted, it is possible to prevent erroneous operations and the like due to excess input of operation command and improve the user's operability.

Further, the present invention is directed to a manual operating apparatus suitable for the image capturing system.

In a second aspect, a manual operating apparatus capable of operating an image capturing apparatus having a driving device. The manual operating apparatus includes a communication device communicating with the image capturing apparatus, an input device inputting a command for controlling the image capturing apparatus, the command including an optical operation command for instructing the driving device of the image capturing apparatus to change a view position, a display device displaying image data received from the image capturing apparatus, and a control device controlling the display device to show a relative positional relationship between the view position of the image capturing apparatus and a target position after changing of the view position based on the optical operation command.

In accordance with this, it is possible to achieve the similar effect as described above.

Furthermore, the present invention is directed to an image capturing apparatus suitable for the image capturing system.

In a third aspect, an image capturing apparatus which is operable from a manual operating apparatus. The image capturing apparatus includes a capture device capturing image data of an object, a generating device generating view position information regarding a view position of the capture device, a communication device receiving a control command from the manual operating apparatus and transmitting data including the image data and the view position information to the manual operating apparatus, a driving device changing the view position of the capture device based on an optical operation command when the control command received from the manual operating apparatus by means of the communication device includes the optical operation command.

In accordance with this, it is possible to achieve the similar effect as described above.

Furthermore, in the system, the manual operating apparatus and the like, it is preferred that the control device controls the display device to show the view position and the target position on scroll bars displayed on the display device or that the control device controls the display device to show the view position and the target position on meters displayed on the display device.

Preferably, the manual operating apparatus receives view position information regarding the view position generated by the image capturing apparatus via communication, and the control device controls the display device to show a relative positional relationship between the view position and the target position after changing the view position based on the view position information and the optical operation command inputted by means of the input device.

In accordance with this, a display which is easy to view by the user can be obtained.

More preferably, the control device sets a display area of the display device based on a range capable of taking an image in the image capturing apparatus and controls the display device to show, in the display area, both image capture ranges of the image capturing apparatus at the target position and the view position.

In accordance with this, it is possible to predict the captured image after driving while comparing the image capture ranges at the target position and the view position with respect to the range capable of taking an image in the image capturing apparatus, so that the user's operability is further improved.

Also, it is preferred that the control device controls the display device, until a new image after changing of the view position is transmitted from the image capturing apparatus, to show an image before changing of the view position in a display position corresponding to the new image.

In accordance with this, since a wide capture range is displayed, the user's operability is further improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing a part particularly related to some features of the present invention in a configuration of a portable phone in the image capturing system.

FIG. 16 is a view showing a part particularly related to some features of the present invention in a configuration of a portable phone in an image capturing system according to the fourth embodiment.

DESCRIPTION OF THE PREFERRED EMBODIMENTS

In the following, preferred embodiments of the present invention will be explained in detail with reference to the attached drawings.

<1. First Embodiment>

When a user (an operator) operates an image capturing apparatus by means of a portable phone, an image capturing system 1 according to the first embodiment counts the number of optical operation commands entered (inputted) from the portable phone by the user, determines a target position after changing a field of view in the image capturing apparatus and displays the target position, and also displays on the screen of the portable phone a view position of the image capturing apparatus at the time when the image data received by the portable phone is obtained.

Figure 1:
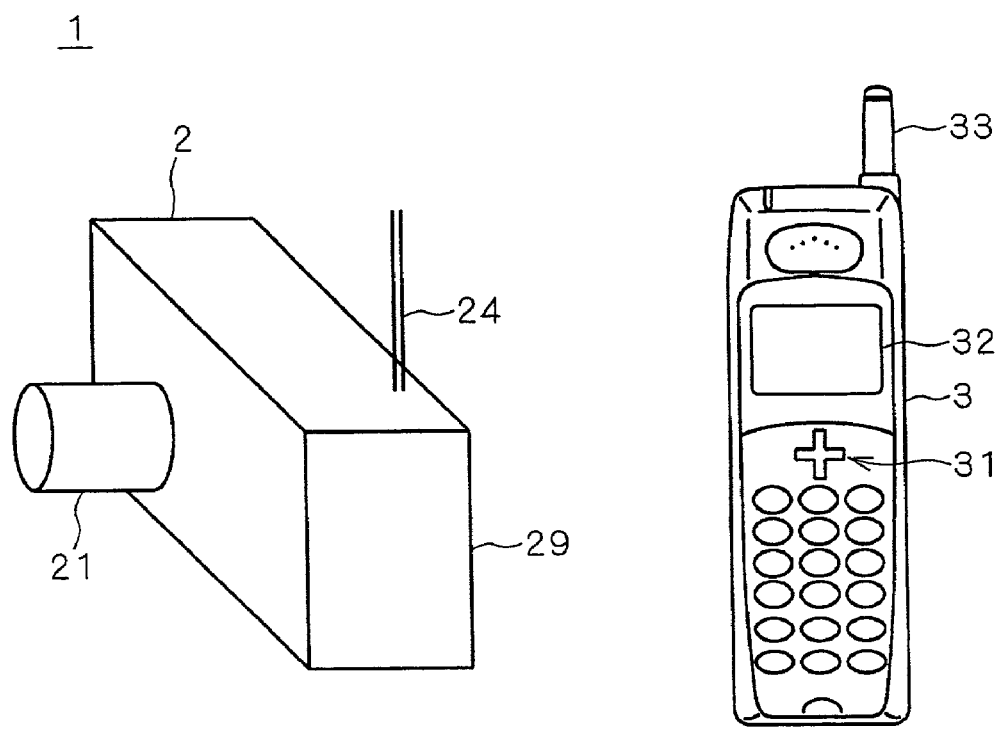
FIG. 1 is a view showing a configuration of an image capturing system according to the present invention.

FIG. 1 is a view showing a configuration of the image capturing system 1 according to the first embodiment of the present invention. The image capturing system 1 comprises a camera (digital still camera or digital movie camera) 2 which embodies the image capturing apparatus and a portable phone 3 serving as a manual operating apparatus which can remotely operate the camera 2. Panning and tilting operations as will be described later are performed not only by a digital movie camera but also by a digital still camera, because the digital still camera has a motion picture capturing function as a live view. So, the present embodiment can be applied to any type of digital camera.

The camera 2 has an image taking system 21 arranged in front of a main body 29 containing circuitry as will be described later, and an antenna 24 for communicating with a portable phone 3. The portable phone 3 has an operational section 31 at which a user inputs an optical operation command and the like with respect to the camera 2, an image display section 32 for displaying an image of received image data, and an antenna 33 for communicating with the camera 2, in addition to circuitry for image processing contained in the main body. In this description, "optical operation command" refers to a command for controlling a driving section 23 of the camera 2 to instruct changing of the field of view in the camera, and more specifically to a pan command, a tilt command, a zoom command and the like.

Figure 2:
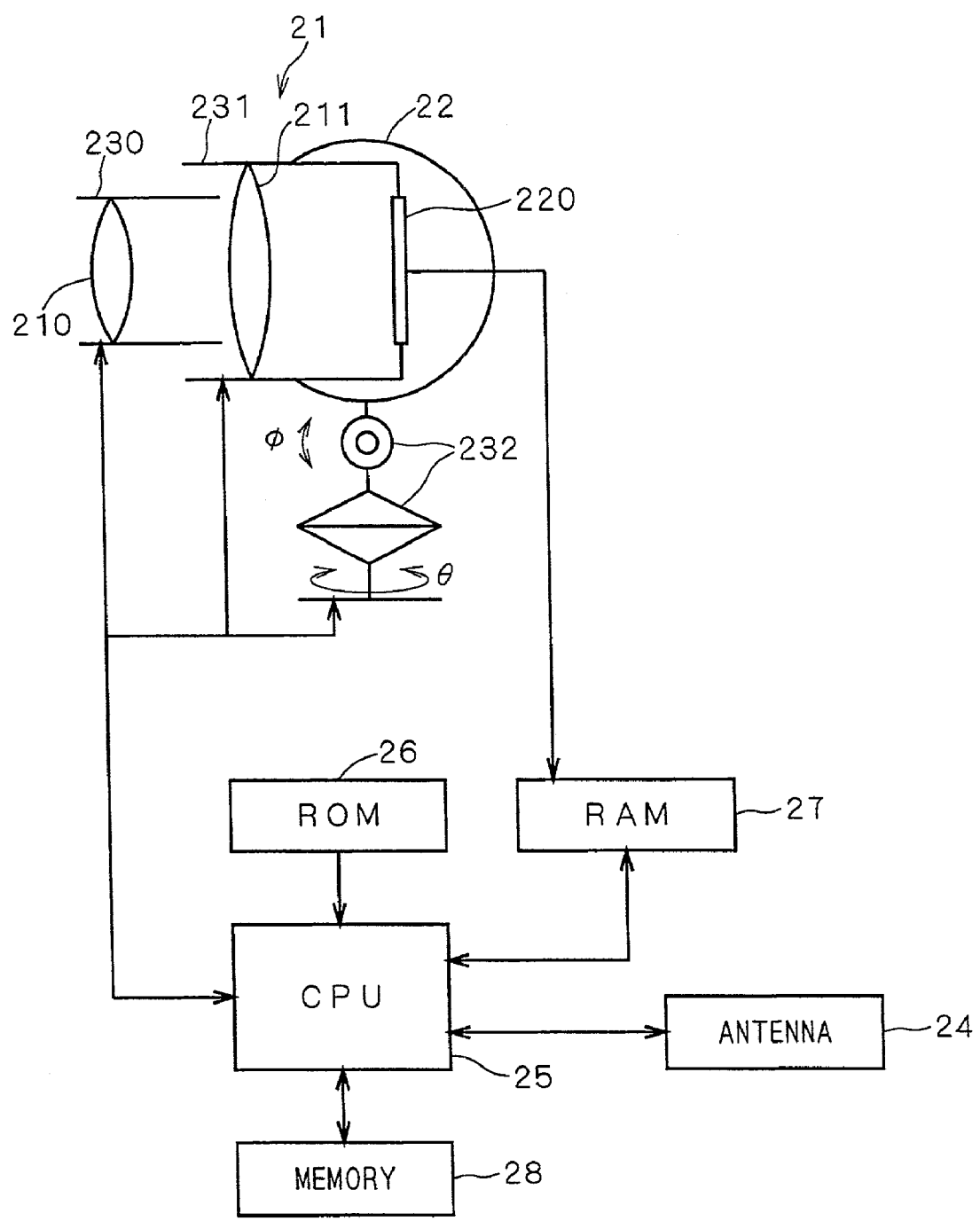
FIG. 2 is a view showing a configuration of a camera in the image capturing system.

FIG. 2 is a view showing an internal configuration of the camera 2. As shown in FIG. 2, the image taking system 21 of the camera 2 includes a zoom lens 210, a focus lens 211, a first driving section 230 for driving the zoom lens 210, a second driving section 231 which drives the focus lens 211 for focusing and drives diaphragm for adjustment, a CCD 220 for optical-to-electrical converting an optical image of a subject formed by the lens (zoom lens 210, focus lens 211 and the like) into an image signal consisting of R (red), G (green), B (blue) color components (a signal consisting of a string of signals), a spherical unit 22 for accommodating the above elements, and a third driving section 232 for driving the spherical unit 22 to perform panning/tilting and zooming.

The third driving section 232 enables the spherical unit 22 to swivel by about ±70° in the pan direction (θ rotation) and to tilt up and down by ±70° in the tilt direction (φ rotation). For achieving these rotary driving in the pan direction and rotary driving in the tilt direction, the third driving section 232 contains a plurality of piezo devices. Also driving of the first driving section 230 for a zooming operation is achieved by other piezo devices than the above piezo devices. By giving a sawtooth signal to these piezo elements, respective objective elements to be driven by the piezo devices slightly move, and repetition of such slight movement will provide the respective objective elements with desired movement. These driving mechanisms are disclosed in, for example, Japanese Patent Application Laid-Open No. 11-18000 and Japanese Patent Application Laid-Open No. 11-41504.

Hereinafter, the first driving section 230, the second driving section 231 and the third driving section 232 are collectively referred to as a driving section 23. The driving section 23 changes the field of view in the camera 2.

The camera 2 acquires image data of an image of a subject mainly by means of the image taking system 21, a CPU 25, a ROM 26 and a RAM 27. That is, an image of the subject is formed on a CCD 220 by means of the lens, converted to digital data by the A/D converter (not shown) and stored in the RAM 27 as image data. The acquired image data is transmitted from the RAM 27 to the memory 28 for storage as is necessary, for example, in response to an image recording instruction command from the portable phone 3. The image data is transmitted to the portable phone 3 via the antenna 24. Controls of these processes are performed by the CPU 25 operating in accordance with programs stored in the ROM 26.

Figure 3:
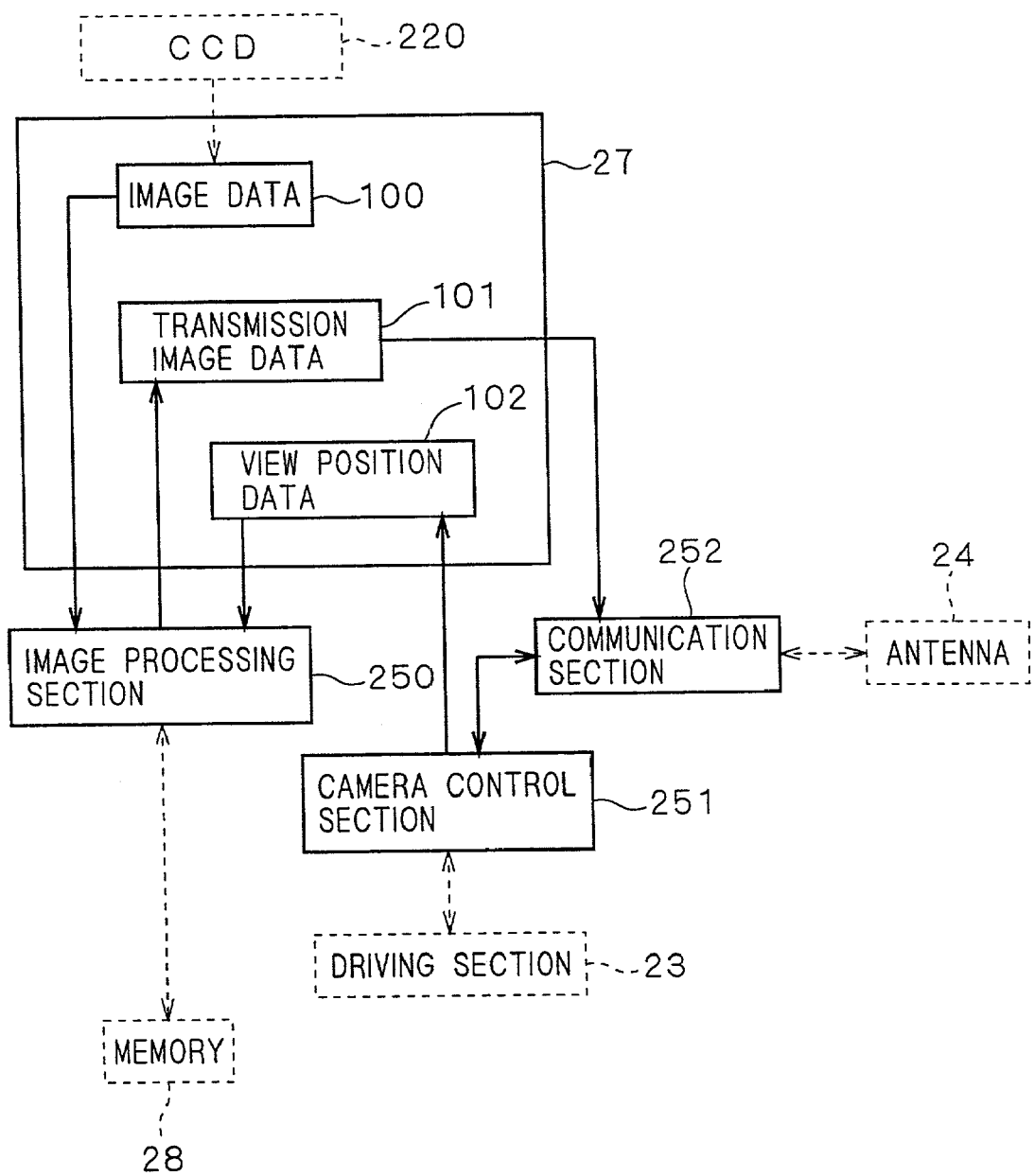
FIG. 3 is a view showing a functional configuration of the camera together with other configuration.

FIG. 3 is a view showing a functional configuration realized by the CPU 25 operating in accordance with programs in the ROM 26, together with other configuration. In the configuration shown in FIG. 3, an image processing section 250, a camera control section 251 and a communication section 252 represent functions realized by the CPU 25.

The image processing section 250 performs color correction, interpolation between pixels, compression process, encryption and the like on image data 100 acquired from the CCD 220, and adds view position data 102 representing information regarding a view position of the camera 2 upon obtaining the image data 100, thereby generating transmission image data 101. Also, the image processing section 250 has a function of transmitting data between the memory 28 and the RAM 27 as is necessary.

The camera control section 251 controls the driving section 23 in accordance with an optical control command received at the communication section 252, as well as generates the view position data 102 regarding the field of view in the camera 2 by monitoring the condition of the driving section 23. Further, the camera control section 251 generates data representing a processing result of commands received at the communication section 252 (hereinafter, referred to as "processing result data") as is necessary, and gives an instruction for the communication section 252 to transmit it to the portable phone 3.

The communication section 252 enables communication between the camera 2 and the portable phone 3 via the antenna 24 using a telephone line, and is able to transmit the view position data 102 and the like to the portable phone 3. And upon reception of an optical operation command or non-optical operation command (commands other than the optical operation command, such as image recording instruction command), the communication section 252 transfers the command to the camera control section 251.

FIG. 4 is a view showing a part in relation to a feature of the present invention in the configuration of the portable phone 3. As shown in FIG. 4, in the portable phone 3, image data received by the antenna 33 is processed by the CPU 34, the ROM 35 and the RAM 36 to be displayed on the image display section 32. In the memory 37, various data such as received image data is stored as necessary. Therefore, also in the portable phone 3, recording of images is possible. Further, various data for the camera 2 is generated and transmitted to the camera 2 via the antenna 33. This data is generated by accepting an instruction of the user from the operational section 31, or automatically generated by the portable phone 3 according to the circumstances. The timer 30 is used in controlling the portable phone 3 by the CPU 34.

Figure 5:
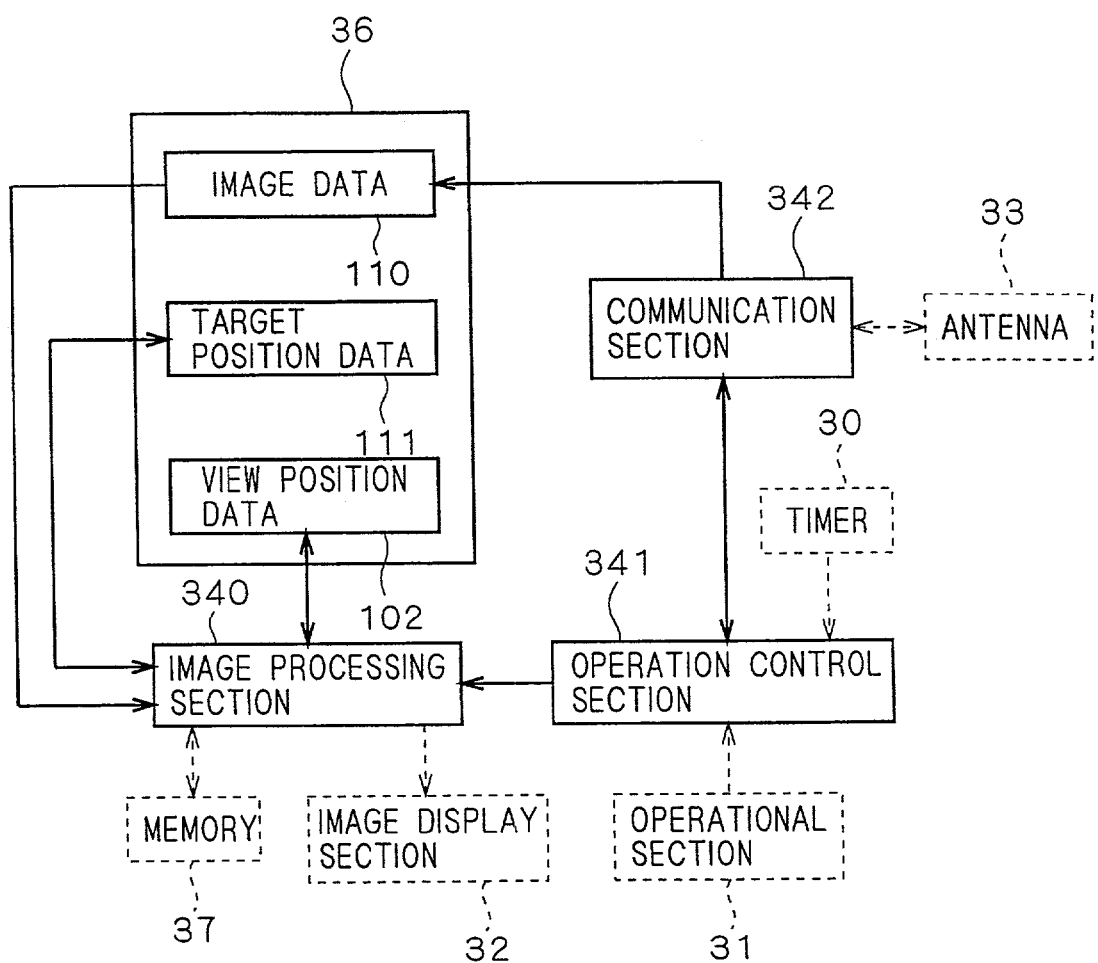
FIG. 5 is a view showing a functional configuration of the portable phone together with other configuration.

FIG. 5 is a view showing a functional configuration realized by the CPU 34 of the portable phone 3 operating in accordance with a program in the ROM 35, as well as other configurations. Among the configurations shown in FIG. 5, an image processing section 340, an operation control section 341 and a communication section 342 represent functions realized by the CPU 34.

The image processing section 340 performs a necessary image processing on image data 110 received by the communication section 342 for display on the image display section 32. In addition, the image processing section 340 generates view position data 102 based on information regarding a view position of the camera 2 at the time of capturing image (view position data 102 added by the camera 2) contained in the image data 110, while displaying the view position at the time of capturing image on the image display section 32. Also, the image processing section 340 has a function of generating target position data 111 representing a target position of visual field of the camera 2 after the inputted optical operation command is executed, on the basis of information regarding the optical operation command inputted from the operation control section 341 and the view position data 102, and displaying the target position of the visual field of the camera 2 on the image display section 32 in accordance with the target position data 111. Furthermore, it stores the image data 110 in the memory 37 as is necessary.

The operation control section 341 accepts an input of user from the operational section 31, generates a necessary command, and transfers information regarding the inputted optical control command to the image processing section 340 and the communication section 342.

The communication section 342 communicates with the camera 2 using a telephone line. Further, if the received data is the image data 110 (corresponding to the transmission image data 101), the communication section 342 transfers it to the RAM 36 for storage, whereas if the received data is the processing result data of command, the communication section 342 transfers it to the operation control section 341.

<1.2. Operations of Camera>

Figure 6:
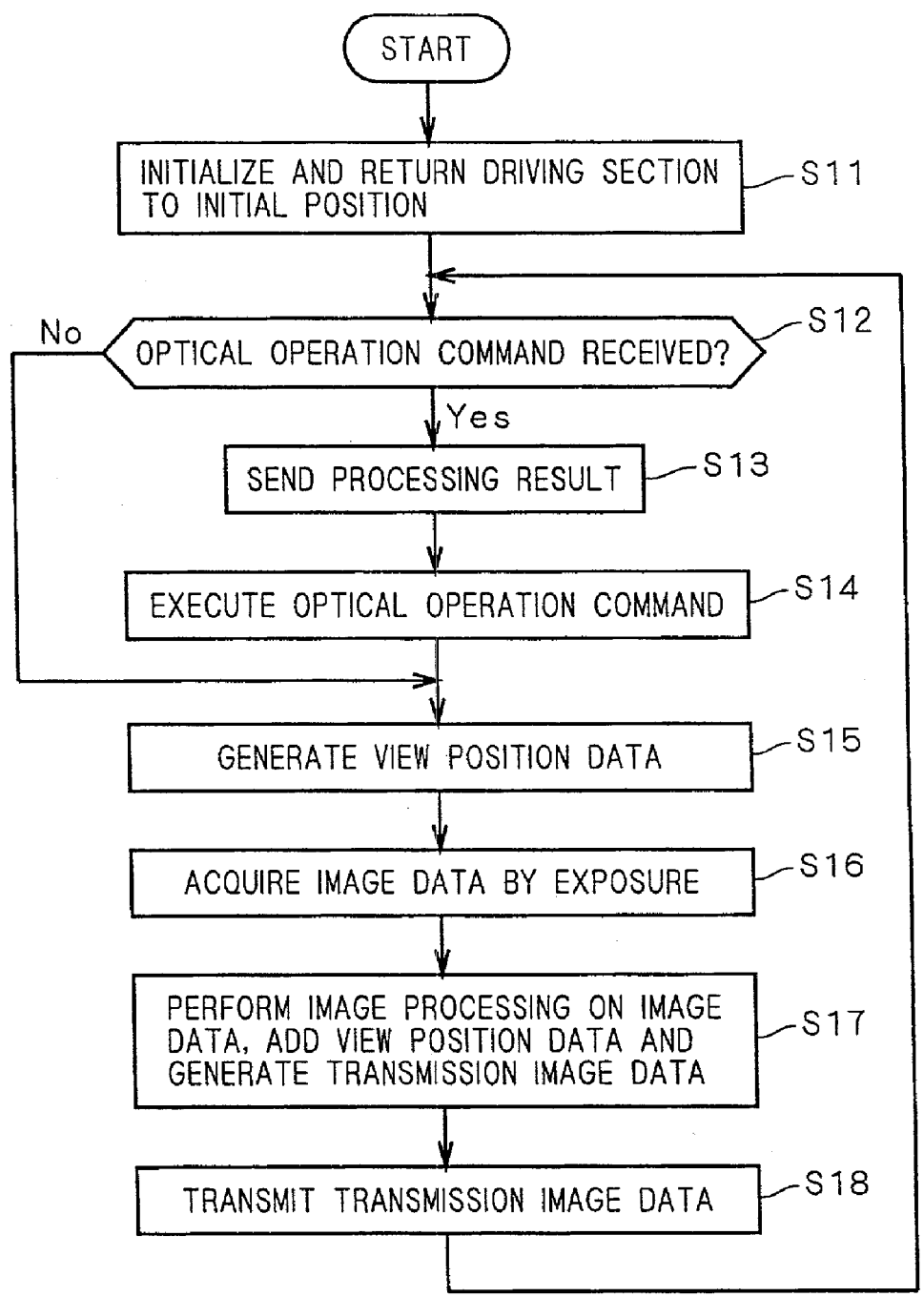
FIG. 6 is a flow chart showing operations of a camera according to the first embodiment.

FIG. 6 is a flow chart showing operations of the camera 2. Operations of the camera 2 will be explained by making reference of FIG. 3 and FIG. 6.

First, the camera control section 251 initializes the camera 2 and returns the driving section 23 to an initial position (step S11). Upon completion of the initialization, whether or not an optical operation command is received by the communication section 252 is determined (step S12), and if an optical operation command is received, an instruction is given to the communication section 252 to transmit processing result data representing that the optical operation command has been received. The communication section 252 transmits the processing result data to the portable phone 3 in accordance with the instruction (step 13). Further, the camera control section 251 drives the driving section 23 in accordance with the received optical operation command to execute the optical operation command (step S14).

On the other hand, if an optical operation command is not received, step S13 and step S14 are skipped.

As a result, when the data received by the communication section 252 is an optical operation command, it is possible to control the driving section 23 in accordance with the optical operation command.

Next, the camera control section 251 generates view position data 102 by monitoring the condition of the driving section 23 in the camera 2 (step S15). The view position data 102 is data representing a pan position, a tilt position and a zoom position of the driving section 23 which determines the visual field of the camera 2. The view position data 102 is used in processes as will be described later.

Upon generation of the view position data 102, image capturing is performed at that view position to acquire image data 100 by the CCD 220 (step S16). Subsequently, the image processing section 250 performs a necessary image processing on the image data 100 and adds the view position data 102 to generate transmission image data 101 (step S17). Besides the view position data 102, data regarding an image to be transmitted such as data size, file format and image capture time may be added to the transmission image data 101.

Then, the communication section 252 transmits the transmission image data 101 to the portable phone 3 (step S18), and repeats the process starting from step S12. In transmitting the transmission image data 101, the communication section 252 does not sequentially transmit the transmission image data 101 of one frame, but successively transmits one of a plurality of segments that are obtained by dividing the transmission image data 101 of one frame, whenever step S18 is executed. Accordingly, step S15 to step S17 are skipped until transmission of the transmission image data 101 of one frame has completed by executing step S18 plural times. As a result, the image capturing system 1 can transmit and receive the optical operation command, the non-optical operation command, the processing result data and the like at real-time.

<1.3. Operations of Portable Phone>

Figure 7:
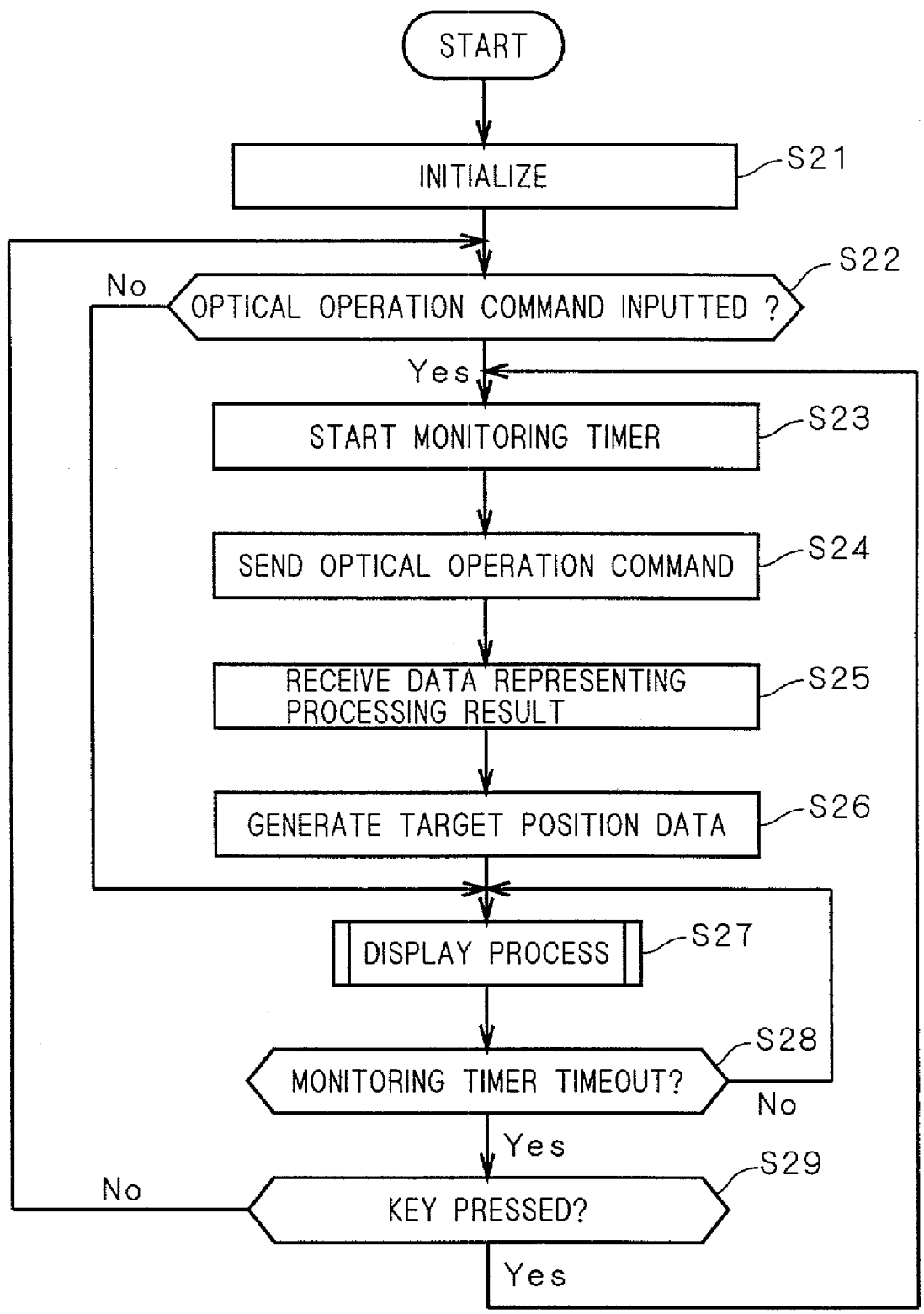
FIG. 7 is a flow chart showing operations of a portable phone in accordance with the first embodiment.

FIG. 7 is a flow chart showing operations of the portable phone 3 in the image capturing system 1 according to the present embodiment. Operations of the portable phone 3 of the image capturing system 1 will be explained by making reference of FIG. 7.

First, the portable phone 3 is initialized (step S21). The initialization includes that the image processing section 340 initializes the view position data 102 based on the initial position of the camera 2 preliminarily stored in the memory 37. Initialization of the view position data 102 may be performed by receiving information regarding the view position of the camera 2 from the camera 2.

Upon completion of the initialization, the operation control section 341 determines whether or not an optical operation command is inputted from the operational section 31 (step S22), and if an optical operation command is not inputted, processings from step S23 to step S26 are skipped.

On the other hand, if an optical operation command is inputted, the operation control section 341 starts the monitoring timer for determining whether or not a key used for inputting the optical operation command is kept pressed (step S23), and gives necessary instruction to the communication section 342 and the image processing section 340 in accordance with the inputted optical operation command.

The communication section 342 transmits the inputted optical operation command in accordance with the instruction from the operation control section 341 (step S24), and receives processing result data which indicates that the camera 2 has received the optical operation command (step S25). It is desirable that the optical operation command is transmitted again when the communication section 342 does not receive the processing result data even after a predetermined time has elapsed from transmission of the optical operation command.

In response to the instruction from the operation control section 341, the image processing section 340 changes the pan position, the tilt position and the zoom position contained in the view position data 102 in accordance with the inputted optical operation command to generate target position data 111 (step S26).

Figure 8:
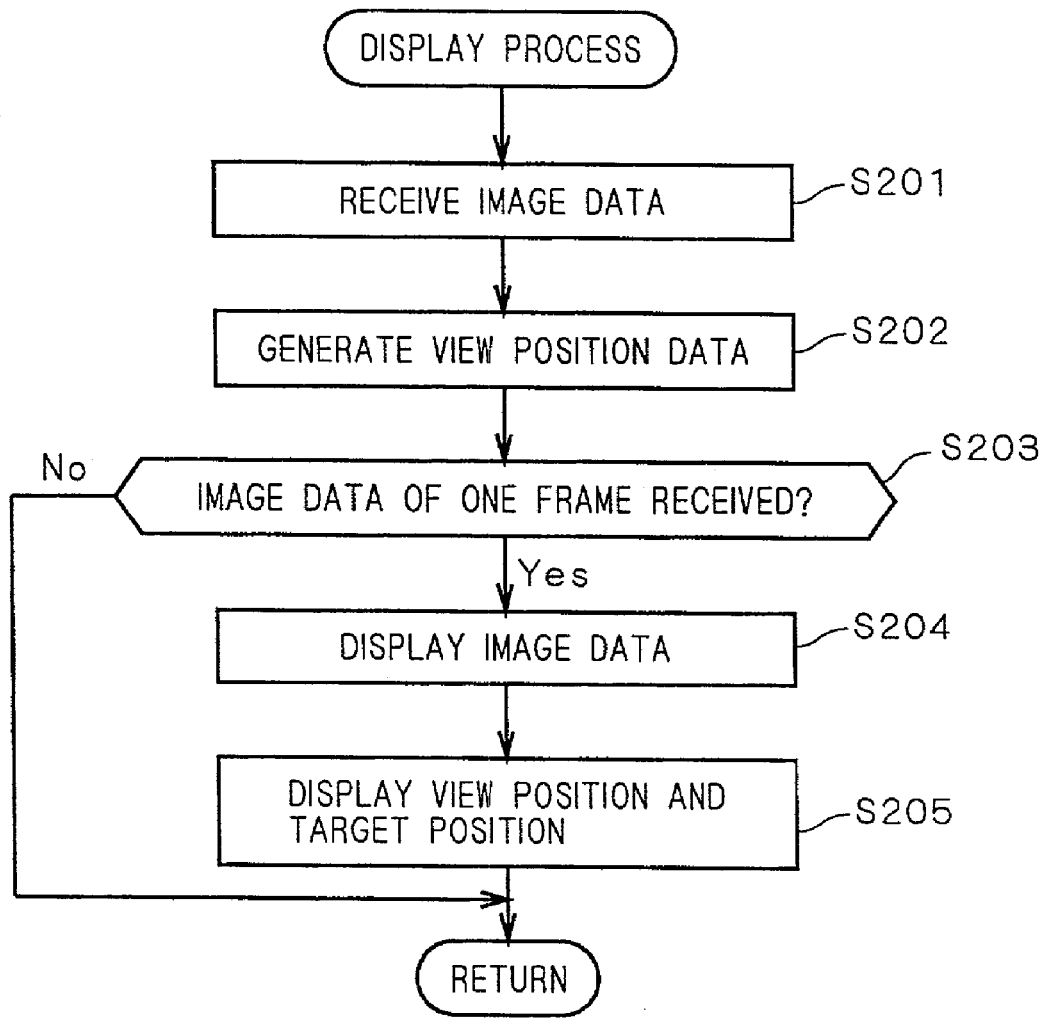
FIG. 8 is a flow chart showing operations of a display process in the portable phone in accordance with the first embodiment.

Next, the portable phone 3 performs a display process (step S27). FIG. 8 is a view showing the details of the display process in the portable phone 3. First the communication section 342 receives image data 110 (step S201). Next, the image processing section 340 acquires information regarding view position from the image data 110 to generate view position data 102 (step S202). Since the transmission image data 101 is successively transmitted in the form of divided segment as described above, the communication section 342 receives divisional segment of the transmission image data 101 one by one at step S201.

Following generation of the view position data, the image processing section 340 determines whether or not the image data 110 of one frame has been received (step S203), and if the image data 110 of one frame has not been received, step S204 and step S205 are skipped to end the display process.

On the other hand, if the image data 110 of one frame has been received, the image processing section 340 performs a necessary image processing on the image data 110 to display on the image display section 32 (step S204), and further displays the view position and the target position of the camera 2 on the image display section 32 based on the view position data 102 and the target position data 111 (step S205) to finish the display process. When the view position and the target position overlap with each other on the image display section 32, it is judged that the view position reaches the target position, and only the view position is displayed. Further, in the case where target position data 111 is not generated and hence target position data 111 does not exist on the RAM 36 because step S26 is skipped in step S22(Yes in step S22), it is determined that operations of the camera 2 according to an optical operation command is not executed, and a target position is not displayed.

Through these processings, it is possible to display the view position on the image processing section 32 in accordance with the view position data 102 regarding the view position of the camera 2 which is received by the communication section 342, as well as it is possible calculate the target position after driving the view position of camera 2 to display it on the image display section 32 in accordance with the optical operation command inputted from the operational section 31. Therefore, the user can predict the image obtained after changing the field of view in the camera 2 in response to the optical operation command by comparing the target position with the view position of the image currently displayed.

Figure 9:
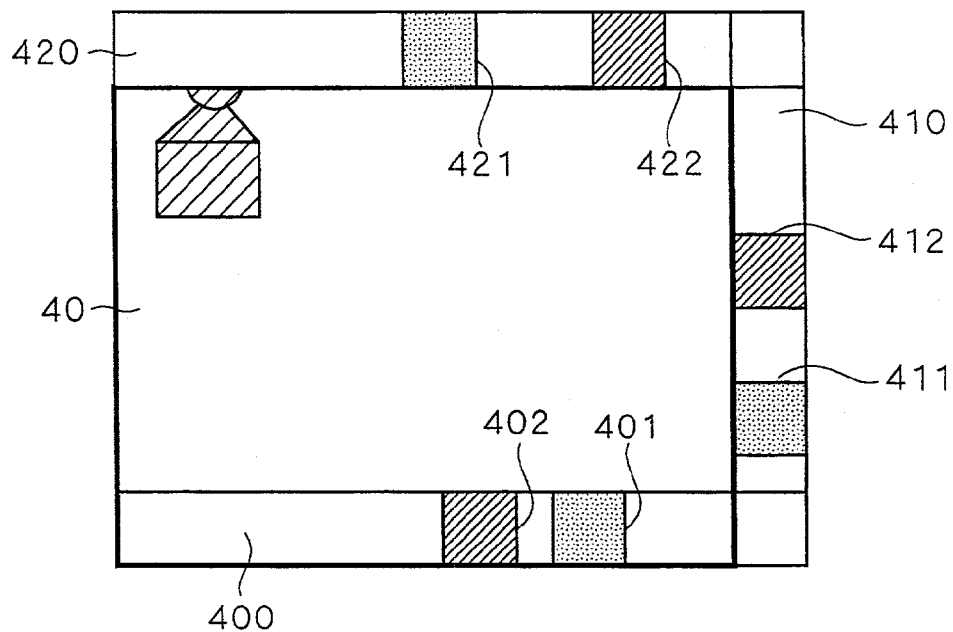
FIG. 9 is a view showing an example of a screen displayed on an image display section of the portable phone during the camera is driven.
Figure 10:
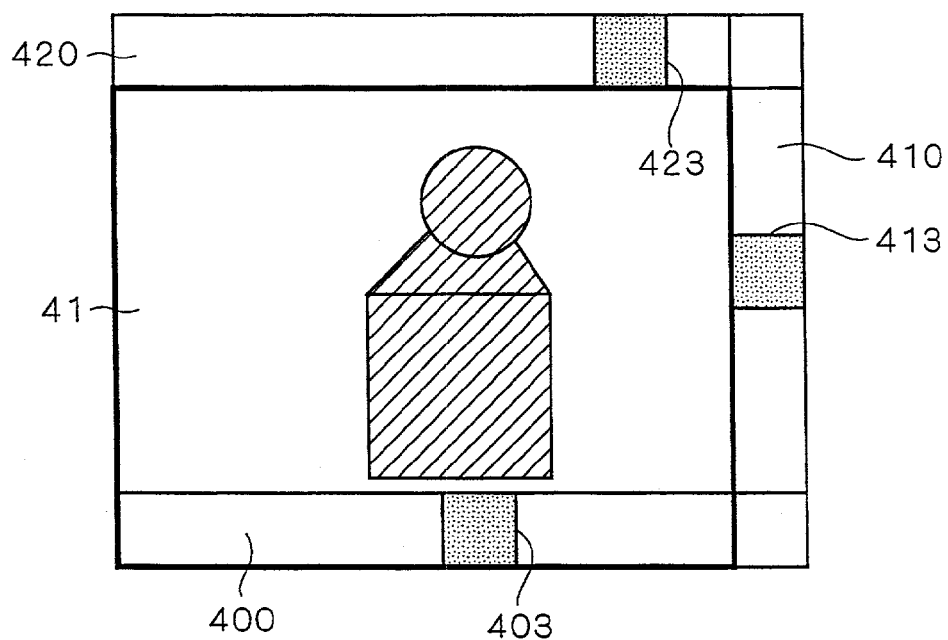
FIG. 10 is a view showing an example of a screen displayed on the image display section of the portable phone after the camera is driven.

FIG. 9 and FIG. 10 are views showing examples of screen displayed on the image display section 32 during the display process of the portable phone 3 according to the present invention. An image 40 shown in FIG. 9 is an image which is captured in the condition that an optical operation command is inputted and the driving section 23 of the camera 2 is driving. Scroll bars 400, 410, 420 in FIG. 9 represent respective drivable ranges of panning, tilting and zooming of the driving section 23 of the camera 2. The drivable range of the driving section 23 in each scroll bar is generated based on the drivable range of the driving section 23 preliminarily stored in the memory 37 of the portable phone 3.

Further, black markers 401, 411, 421 on the respective scroll bars represent a pan position, a tilt position and a zoom position when the image 40 is captured, and are calculated based on view position data 102 added to the image data 110 from which the image 40 was generated. Further, shaded markers 402, 412, 422 respectively show target positions of pan position, tilt position and zoom position of the driving section 23 calculated from the target position data 111.

When the portable phone 3 receives new image data 110, view position data 102 to be added to the image data 110 is obtained in step S27 (FIG. 7), and the markers 401, 411, 421 are displayed on the image display section 32 in displaying the new image. When the user inputs an optical operation command, target position data 111 is newly rewritten in step S25, and the new target position is displayed by means of the markers 402, 412, 422.

Therefore, during the period of time in which driving of the camera 2 is carried out in response to the pan, tilt and zoom commands, the markers 401, 411, 421 representing the current view positions move toward the markers 402, 412, 422 representing the respective target positions.

An image 41 shown in FIG. 10 is an image captured in the condition that driving of the driving section 23 has been completed. Each scroll bar in FIG. 10 has the same meaning as that having the same reference numeral in FIG. 9, and black markers 403, 413, 423 on the respective scroll bars represent a pan position, a tilt position and a zoom position at the time of capture of the image 41 based on the view position data 102 added to the image data 110 from which the image 41 is generated. As shown in FIG. 10, after completion of the driving, since the view position overlaps with the target position, markers generated based on the target position data 111 are not displayed.

In this way, it is possible to display the view position and the target position on the scroll bars displayed on the image display section 32 of the portable phone 3, and hence the user can readily predict an image after driving of the camera 2 by comparing the current view position and the target position after driving.

Returning to FIG. 7, the operation control section 341 determines whether the monitoring timer has timed out or not (step S28), and in the case where the monitoring time has not timed out, step 27 to step 28 are repeated. In the case where the monitoring time has timed out, the operation control section 341 further determines whether or not the key for inputting the optical operation command is kept pressed (step S29), and if the key is being pressed, it is determined that the user keeps inputting the same optical operation key, and the process starting from step S23 is repeated. If the key is not being pressed, the process from S22 is repeated.

As described above, in the image capturing system 1 according to the present embodiment, the degree of change in view position of the camera 2 with respect to the current view position from the inputted optical operation command can readily be predicted, so that it is possible to prevent an erroneous operation such as inputting optical operation commands in excess in contrast to the case where a current view position is not displayed.

<2. Second Embodiment>

In the first embodiment, the view position and the target position are displayed on the scroll bars provided in the image display section 32 of the portable phone 3, however, the view position and the target position may be displayed by using meters.

Figure 11:
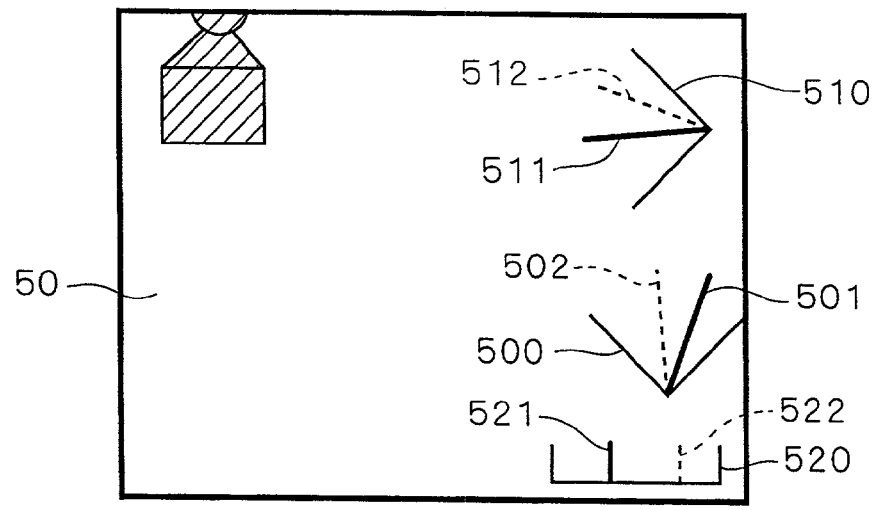
FIG. 11 is a view showing an example of a screen displayed on the image display section of the portable phone during the camera is driven in accordance with the second embodiment.
Figure 12:
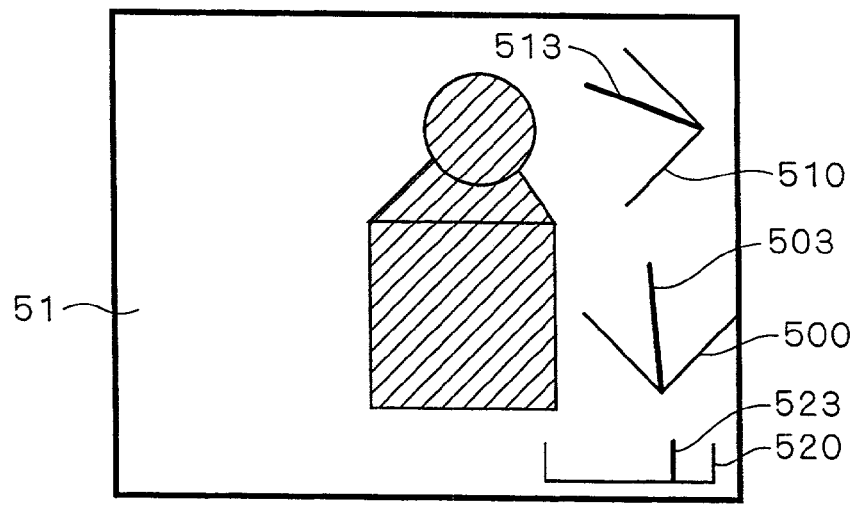
FIG. 12 is a view showing an example of a screen displayed on the image display section of the portable phone after the camera is driven in accordance with the second embodiment.

FIG. 11 and FIG. 12 are views showing examples of displaying a view position and a target position of the camera 2 on the image display section 32 of the portable phone 3 in the image capturing system 1 according to the second embodiment. The image capturing system 1 in the present embodiment has the similar configuration as the first embodiment, and hence the explanation thereof will be omitted.

FIG. 11 and FIG. 12 are views showing examples of screen displayed on the image display section 32 in a display process of the portable phone 3 according to the present embodiment. An image 50 shown in FIG. 11 is an image captured in the condition that an optical operation command is inputted from the operational section 31 and the driving section 23 of the camera 2 is driving. Furthermore, meters 500, 510, 520 represent drivable ranges of panning, tilting and zooming of the driving section 23 of the camera 2, respectively.

Furthermore, needles 501, 511, 521 denoted by the black bold lines on the meters respectively show a pan position, a tilt position and a zoom position at the time of capture of the image 50, and are calculated on the basis of the view position data 102 added to the image data 110 from which the image 50 is generated. Further, needles 502, 512, 522 denoted by the dotted lines respectively show target positions of the pan position, the tilt position and the zoom position of the driving section 23 on the basis of the target position data 11.

An image 51 shown in FIG. 12 is an image which is captured in the condition that the driving section 23 has completed driving. Further, each meter in FIG. 12 is as same in meaning as that denoted by the same reference numeral in FIG. 11, and needles 503, 513, 523 denoted by the black bold lines on the meters respectively show a pan position, a tilt position and a zoom position at the time of capture of the image 51 based on the view position data 102 added to the image data 110 from which the image 51 is generated.

With the above configuration, in the image capturing system 1 according to the present embodiment, it is possible to display a view position and a target position on a meter displayed on the image display section 32 of the portable phone 3 in operating the camera 2 by means of the portable phone 3, so that also by means of such procedure, the similar effect as the first embodiment can be obtained.

<3. Third Embodiment>

In the above embodiment, the scroll bars and meters are provided on the image display section 32 for displaying the view position and the target position of the camera 2, however, it is also possible to set the display area of the image display section 32 of the portable phone 3 as a full range where the camera 2 can capture an image, and to display the latest image, view position and target position at corresponding points in the full range.

Figure 13:
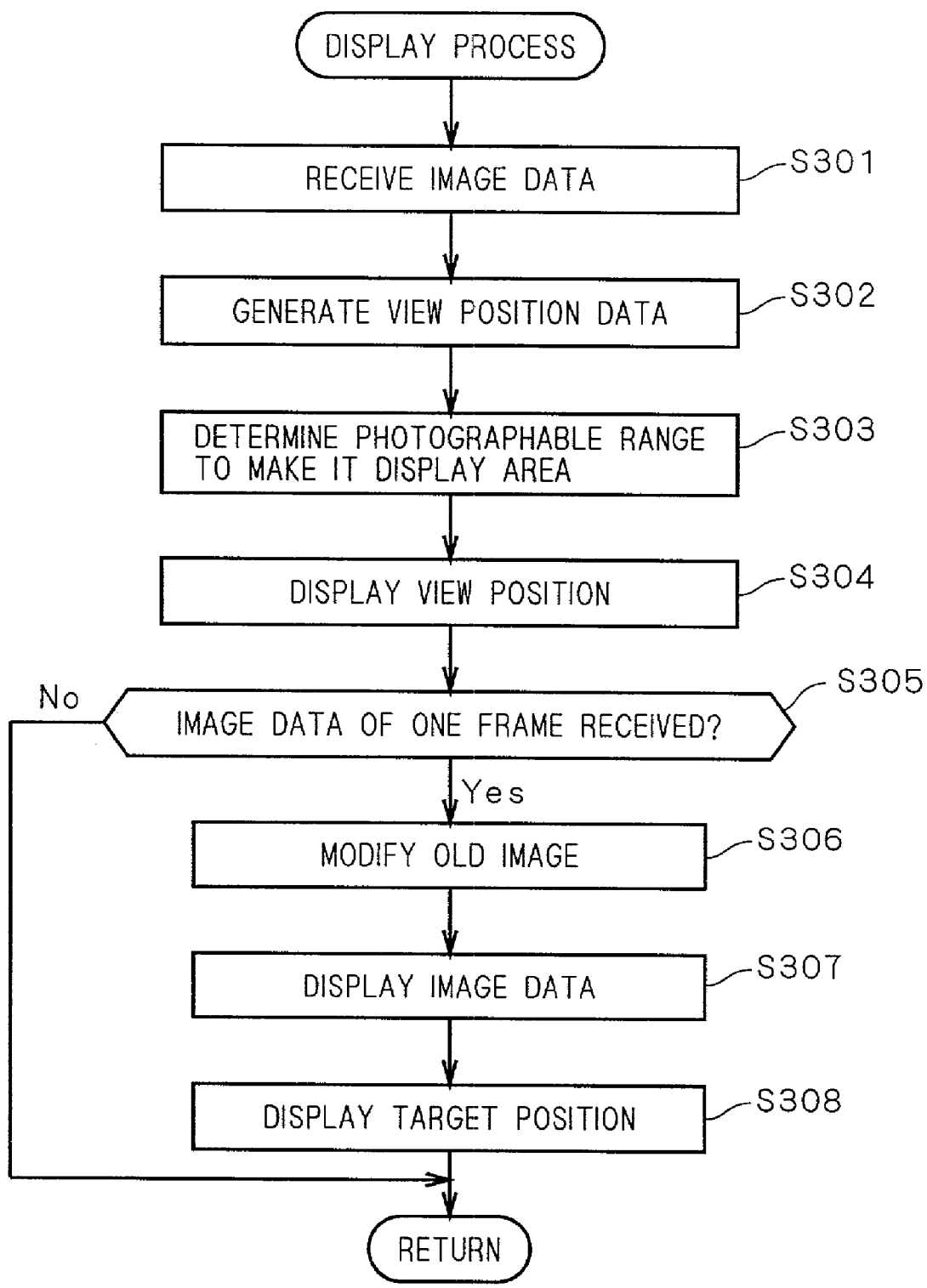
FIG. 13 is a flow chart showing operations of a display process of the portable phone in accordance with the third embodiment.

FIG. 13 is a flow chart showing the details of the display process (step S27 in FIG. 7) of the portable phone 3 according to the third embodiment. Operations of the display process of the portable phone 3 of the present embodiment will be explained by using FIGS. 13 to 15. The configuration of the image capturing system 1 according to the present embodiment is similar to that of the above embodiment.

First, likewise the first embodiment, the portable phone 3 receives image data 110 (step S301), and generates view position data 102 (step S302). Subsequently, the image processing section 340 calculates the full range of the camera 2 based on the drivable range of the driving section 23 of the camera 2 preliminarily stored in the memory 37 and a zoom position of the view position data 102, and set the display area of the image display section 32 as the full range (step S303).

Next, based on the view position data 102, the portable phone 3 displays the view position as a frame showing the capture range of the camera 2 (step S304) and determines whether or not the image data 110 of one frame has been received (step S305). If the image data 110 of one frame has not been received, the portable phone 3 skips steps 306 to 308 to complete the display process.

On the other hand, if the image data 110 of one frame has been received, the portable phone 3 makes a correction of changing the chroma of an old image when such old image is displayed (step S306) and displays the image data 110 of which reception has completed (step S307). As for the part where the old image and the image from the newly received image data 110 (hereinafter, referred to as "new image") overlap with each other, the new image is displayed.

Further, based on the target position data, the portable phone 3 displays the target position as a frame representing a capture range after driving of the camera 2 (step S308) to complete the display process.

Figure 14:
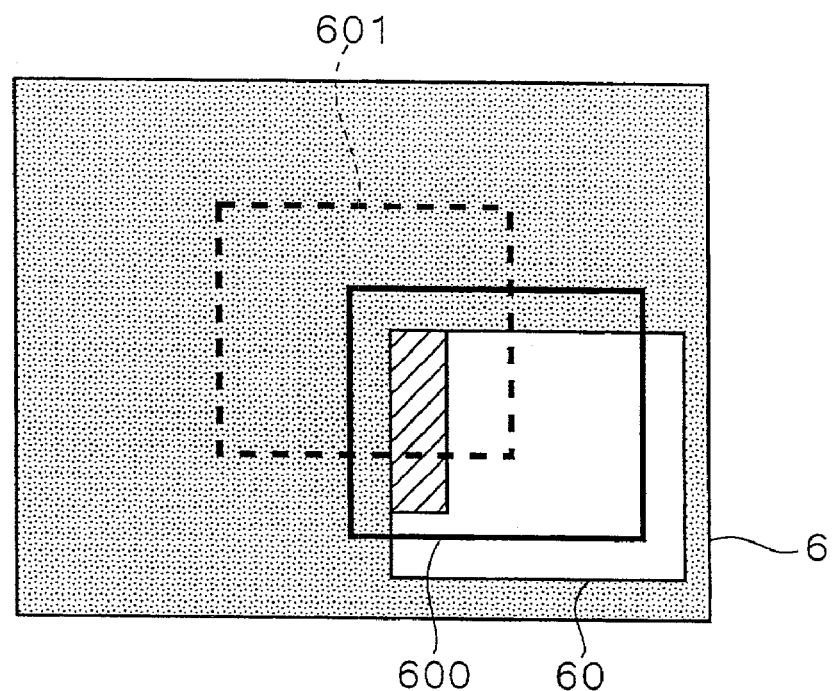
FIG. 14 is a view showing an example of a screen displayed on an image display section of the portable phone during the camera is driven.
Figure 15:
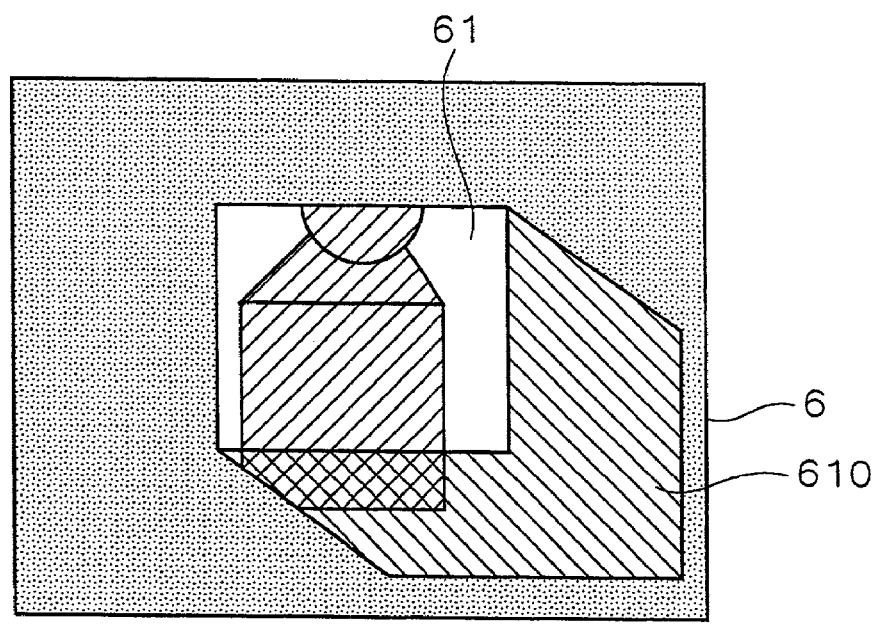
FIG. 15 is a view showing an example of a screen displayed on the image display section of the portable phone after the camera is driven.

FIGS. 14 and 15 are views showing examples of screen displayed on the image display section 32 in the display process of the portable phone 3 in accordance with the present embodiment. A range 6 shown in FIG. 14 represents the full range of the camera 2, and an image 60 is the latest image displayed based on the image data 110 for which reception of one frame data has completed. Further, a view frame 600 is a frame representing a view position generated on the basis of the view position data acquired from the image data 110 currently being received (namely, corresponding to a capture range of the image to be displayed next), and a predictive frame 601 is a frame representing a target position after driving generated on the basis of the target position data (namely, corresponding to a capture range after driving).

As a result of the above, the image processing section 340 can set the display area of the image display section 32 based on the full range of the camera 2 and display in the display area capture ranges of the camera 2 at the target position and the view position, making it possible to improve the operability of the user as is the case of the first embodiment.

An image 61 shown in FIG. 15 is an image displayed based on the image data 110 captured at the position after driving. Further, a corrected image 610 is an old image on which a correction is made. As shown in FIG. 15, the corrected image 610 is such that the overlapping part is overwritten by the image 61 and only the part not overlapping is displayed.

As a result, it is possible to display the old image before changing of the view position in a display position corresponding to a new image until the new image after changing of the view position is transmitted from the camera 2, so that the relationship of capture range between the image previously captured and the image currently captured becomes clear, which improves the operability of the user. In the above description, a correction of changing the chromo of the old image is carried out for displaying the new image, however, the procedure of correction is not limited to this. For example, any procedures such as hatching on an old image, giving gradation depending on the degree of new/old, and the like may be applied insofar as they allow the user to discriminate the old and the new images. Furthermore, when the zoom position is changed, the image processing section 340 magnifies or reduces the old image by an image processing based on the zoom position of the view position data 102 after changing to generate the corrected image 610.

In the manner as described above, likewise the first embodiment, the user can know the capture range (target position) after driving while confirming the capture range (view position) of the displayed image. Furthermore, it is possible to know the view position and the target position with respect to the full range of the camera 2, so that the operability of user is further improved.

<4. Fourth Embodiment>

In the explanation of the third embodiment, input of the optical operation command for driving the camera 2 is entered from the operational section 31 as is the case of the first embodiment, however, in the condition that the full range of the camera 2 is displayed on the image display section 32, designating a point on the full range displayed by the image display section 32 as the user intended position will further improve the operability.

FIG. 16 is a view showing an internal configuration of the portable phone 3 in the fourth embodiment. As shown in FIG. 16, in the present embodiment, the image display section 32 of the portable phone 3 is implemented by a display of touch panel type, and hence the present embodiment differs from the first to the third embodiments in that input of a signal to the operation control section 341 is enabled by the user touching a point of the screen and that when an input is made from the image display section 32, the operation control section 341 refers the view position data 102.

In addition to the functions similar to those of the first to the third embodiments, the operation control section 341 has a function of calculating the numbers of pan commands and tilt commands necessary for driving the view position to a designated viewing point based on a signal indicating one point on the full range from the image display section 32 (signal indicating the coordinates of the viewing point with respect to the full range of the camera 2 intended by the user) and the view position data 102.

That is, in the portable phone 3 of the fourth embodiment, after the image display section 32 displays the full range of the camera 2, the user touches any point on the full range on the image display section 32 for acquiring positional coordinates thereof. The portable phone 3 acquires the positional coordinates and converts them to a necessary optical operation command, and thereafter, the same process is executed as is the case where an optical operation command is inputted from the operational section 31.

In the manner as described above, input of an optical operation command by the operational section 31 is enabled by touching on the screen of the image display section 32, so that it is possible to improve the operability compared to the case where the user inputs by operating the operational section 31. When the input is made by a finger or the like of the user, the input of position is not usually correct. For such a case, first the driving section 23 of the camera 2 is driven to the designated view position, and thereafter input from the operational section 31 may be performed for driving to the correct position.

<5. Modified Embodiment>

In the foregoing, several embodiments of the present invention have been explained, it is to be understood that the present invention may be modified in various ways without limited to the above embodiments.

For example, in the above embodiments, the explanation was made for the case where the portable phone 3 is applied as the operating apparatus in the image capturing system 1, however the operating apparatus is not limited to the portable phone 3, but, for example, a special portable terminal or a personal computer may be used. That is, any apparatus is applicable insofar as it has functions of transmitting an operation signal by a user to a camera and receiving and displaying an image captured by the camera.

Further, the communication method between the image capturing apparatus and the operating apparatus is not limited to that of the above embodiments. For example, radio communications such as Bluetooth or the Internet may be applicable.

Further, in the camera 2 and the portable phone 3, the series of image processings are executed by software process by CPU, however, such processings may partly or fully implemented by special circuitry.

Furthermore, in the above embodiments, a target position is calculated on the basis of an optical operation command inputted to the portable phone 3, however, it is also possible that the camera 2 sends back the received information representing the optical operation command to the portable phone 3 and a target position is calculated on the basis of that information. This can be beneficial for the case where transmission data of the optical operation command is lost in the course of transfer. Further, in this case, the data corresponding to the target position data 111 may be generated at the camera 2.

Furthermore, the drivable range of the driving section 23 of the camera 2 is not limited to being preliminarily stored in the portable phone 3. For example, this may be contained in various data transmitted from the camera 2.

Furthermore, in the above embodiments, explanation was made for the case that the view position data 102 is transmitted with being added to the transmission image data 101, however, the case is not limited to this. The view position data 102 may be transmitted separately from the transmission image data 101 insofar as the view position data can be received by the portable phone 3 with being linked with the transmission image data 101.

Furthermore, in the third embodiment as described above, correction of an old image currently displayed is executed when new image data 110 is received, the old image may not be displayed. This leads reduction of image processings.

In the above embodiments, the view position and the target position are displayed within the display representing the drivable range so as to be movable (the view position moves with a change in visual position and the target position moves with an input in optical operation command). Not being limited to this, other forms that display the relative positional relationship between the view position and the target position may be applicable. For example, defining the view position of the image currently displayed as the center of scroll bar, then a marker of target position may be displayed at a distance which corresponds to a difference between the view position and the target position. In such a case, whenever view position information added to the captured image is updated, or whenever a new image is displayed, markers of the target position move. Furthermore, markers of the view position may be moved while defining the target position as the center of the scroll bar.

The present invention may be embodied by either a computer system controlled in accordance with software programs or a hardware system having individual hardware elements for conducting the respective steps are described in the preferred embodiments. Both of the software elements and the hardware elements are included in the terminology of "devices" which are elements of the system according to the present invention.

While the invention has been shown and described in detail, the foregoing description is in all aspects illustrative and not restrictive. It is therefore understood that numerous modifications and variations can be devised without departing from the scope of the invention.

What is claimed is:

1. An image capturing system comprising:
   a) an image capturing apparatus; and
   b) a manual operating apparatus connected with said image capturing apparatus via communication, receiving image data from said image capturing apparatus, operating said image capturing apparatus via communication and including a display, wherein
   said image capturing apparatus includes:
   a-1) a generating device generating view position information regarding a view position of said image capturing apparatus;
   a-2) a first communication device communicating with said manual operating apparatus and transmitting said view position information to said manual operating apparatus;
   a-3) a view position changing device changing said view position of said image capturing apparatus on the basis of an optical operation command regarding a pan position, a tilt position and a zoom position, and
   said manual operating apparatus is capable of continuously inputting said optical operation command, and includes:
   b-1) a second communication device communicating with said image capturing apparatus and receiving said view position information from said image capturing apparatus;
   b-2) a display controller displaying, on said manual operating apparatus, a relative positional relationship between said view position and a target position after changing of said view position on the basis of said view position information and said optical operation command; and
   b-3) an updating device updating display of said relative positional relationship on the basis of said view position information repeatedly received during operation of said view position changing device.

2. The image capturing system according to claim 1, wherein
   said display controller displays said view position and said target position on a scroll bar displayed on said display.

3. The image capturing system according to claim 1, wherein
   said display controller displays said view position and said target position on a meter displayed on said display.

4. The image capturing system according to claim 1, wherein
   said display controller sets a display area of said display on the basis of a range capable of taking an image in said image capturing apparatus and displays, in said display area, both image capture ranges of said image capturing apparatus at said target position and said view position.

5. The image capturing system according to claim 1, wherein
   said optical operation command is input by touching on a screen of said display.

* * * * *